United States Patent
Millon

(10) Patent No.: US 10,367,175 B2
(45) Date of Patent: Jul. 30, 2019

(54) MULTICAVITY BATTERY MODULE

(71) Applicants: Bosch Battery Systems, LLC, Orion, MI (US); Robert Bosch GmbH, Stuttgart (DE)

(72) Inventor: Christopher Millon, Grand Blanc, MI (US)

(73) Assignees: Bosch Bettery Systems LLC, Orion, MI (US); Robert Bosch GmbH, Stuttgart (DE)

( * ) Notice: Subject to any disclaimer, the term of this patent is extended or adjusted under 35 U.S.C. 154(b) by 308 days.

(21) Appl. No.: 15/136,141

(22) Filed: Apr. 22, 2016

(65) Prior Publication Data

US 2017/0309870 A1    Oct. 26, 2017

(51) Int. Cl.
*H01M 2/02* (2006.01)
*H01M 10/0525* (2010.01)

(52) U.S. Cl.
CPC ....... *H01M 2/0267* (2013.01); *H01M 2/0212* (2013.01); *H01M 2/0262* (2013.01); *H01M 2/0275* (2013.01); *H01M 2/0287* (2013.01); *H01M 10/0525* (2013.01)

(58) Field of Classification Search
CPC . H01M 2/0262; H01M 2/0267; H01M 2/0287
USPC ........................................ 429/149, 156, 159
See application file for complete search history.

(56) References Cited

U.S. PATENT DOCUMENTS

| | | | |
|---|---|---|---|
| 5,422,200 A * | 6/1995 | Hope | H01M 2/1061 429/157 |
| 6,296,967 B1 | 10/2001 | Jacobs et al. | |
| 7,666,542 B2 | 2/2010 | Takamatsu | |
| 7,960,054 B2 | 6/2011 | Zhang et al. | |
| 8,652,672 B2 | 2/2014 | Whitacre et al. | |
| 8,940,429 B2 | 1/2015 | Spare | |
| 2003/0013015 A1 | 1/2003 | KLein et al. | |
| 2003/0082445 A1 * | 5/2003 | Smith | B32B 27/08 429/176 |
| 2009/0023059 A1 | 1/2009 | Kinoshita et al. | |
| 2010/0136404 A1 * | 6/2010 | Hermann | H01M 2/1016 429/120 |
| 2011/0183183 A1 | 7/2011 | Grady et al. | |
| 2013/0071718 A1 * | 3/2013 | Cho | F28F 21/084 429/120 |
| 2013/0143094 A1 | 6/2013 | Huang et al. | |
| 2013/0171490 A1 | 7/2013 | Rothkopf et al. | |

(Continued)

FOREIGN PATENT DOCUMENTS

KR    1020150092854    8/2015

OTHER PUBLICATIONS

PCT International Search Report for PCTEP2017/058123 dated Jun. 9, 2017.

*Primary Examiner* — Sean P Cullen
(74) *Attorney, Agent, or Firm* — Kelly McGlashen; Maginot Moore & Beck LLP

(57) ABSTRACT

A battery module includes a battery module housing that defines an interior space. The battery module housing includes at least one interior wall that segregates the interior space into at least two cavities. The battery module housing and the at least one interior wall are formed of a flexible laminate material, and an electrochemical cell is disposed in one of the at least two cavities. The cell may include a housing formed of a flexible laminate material, or alternatively may be housing-free.

13 Claims, 6 Drawing Sheets

(56) References Cited

U.S. PATENT DOCUMENTS

| | | |
|---|---|---|
| 2013/0236792 A1 | 9/2013 | Terado |
| 2013/0323563 A1* | 12/2013 | Eo .......................... H01M 2/30 |
| | | 429/120 |
| 2015/0086842 A1 | 3/2015 | Kang et al. |
| 2015/0214569 A1 | 7/2015 | Kim et al. |
| 2015/0280284 A1 | 10/2015 | Shakespeare et al. |
| 2017/0025646 A1* | 1/2017 | Ota .................... H01M 2/0217 |
| 2017/0117517 A1* | 4/2017 | Smith ................ H01M 2/1016 |

* cited by examiner

MULTICAVITY BATTERY MODULE

BACKGROUND

1. Field of the Invention

The present disclosure relates to a battery module that includes a battery module housing that is segregated into individual cavities, and each cavity is configured to receive a single electrode cell.

2. Description of the Related Art

Battery packs provide power for various technologies ranging from portable electronics to renewable power systems and environmentally friendly vehicles. For example, hybrid electric vehicles (HEV) use a battery pack and an electric motor in conjunction with a combustion engine to increase fuel efficiency. Battery packs are formed of a plurality of battery modules, where each battery module includes several electrochemical cells. The cells may be arranged in two or three dimensional arrays and are electrically connected in series or in parallel. Likewise, the battery modules within a battery pack are electrically connected in series or in parallel.

Different cell types have emerged in order to deal with the space requirements of a very wide variety of installation situations, and the most common types used in automobiles are cylindrical cells, prismatic cells, and pouch cells. Regardless of cell type, each cell includes a cell housing and an electrode assembly disposed in the cell housing. With respect to the cell housing, the cylindrical cells and prismatic cells each have a rigid housing, usually made of metal or plastic, which seals off the actual battery space from the environment. In contrast, the pouch cell includes a flexible housing made of a metal foil laminate material.

Although battery packs are used in fully electric vehicles and HEVs, challenges remain for improving the energy density, and reducing mass, complexity and costs of the battery packs. In addition, it remains difficult to integrate battery packs into existing internal combustion engine vehicle designs.

SUMMARY

In some aspects, a battery module for receiving electrochemical cells includes a battery module housing that defines an interior space. The battery module housing includes at least one interior wall that segregates the interior space into at least two cavities. The battery module housing and the at least one interior wall are formed of a flexible laminate material. An electrochemical cell is disposed in one of the at least two cavities, the electrochemical cell comprising an electrode assembly.

The battery module includes one or more of the following features: The battery module housing includes a first exterior wall, a second exterior wall, and the at least one interior wall, and a periphery of the first exterior wall, the second exterior wall, and the at least one interior wall are joined via a common seal joint. The battery module housing includes a first exterior wall and a second exterior wall, and the at least one interior wall is arranged in parallel to both the first exterior wall and the second exterior wall. Each cavity of the at least two cavities includes, at most, a single electrochemical cell. The electrode assembly includes a single positive electrode, a single negative electrode, and a separator disposed between the positive electrode and the negative electrode. Each of the positive electrode, the negative electrode, and the separator have the form of a plate, and the positive electrode, the separator and the negative electrode are arranged in a stack such that the separator is sandwiched between the positive electrode and the negative electrode. The electrochemical cell comprises a cell housing that is formed of a flexible laminate material, and the electrode assembly is disposed inside the cell housing. The electrochemical cell is free of a cell housing, and the electrode assembly is disposed inside the one of the at least two cavities in such a way that one of the positive electrode and the negative electrode faces the at least one interior wall. A peripheral edge of the battery module housing defines a non-rectangular polygonal shape when the battery module is seen in top plan view. A peripheral edge of the battery module housing defines an irregular curvilinear shape when the battery module is seen in top plan view.

In some aspects, a battery module for receiving electrochemical cells includes a battery module housing that defines an interior space. The battery module housing includes at least one interior wall that segregates the interior space into at least two cavities. The battery module housing and the at least one interior wall are formed of a flexible laminate material. In addition, each cavity of the at least two cavities is shaped and dimensioned to accommodate, at most, a single electrochemical cell.

The battery module includes one or more of the following features: The battery module housing includes a first exterior wall, a second exterior wall, and the at least one interior wall. A periphery of the first exterior wall, the second exterior wall, and the at least one interior wall are joined via a common seal joint. The battery module housing includes a first exterior wall and a second exterior wall, and the at least one interior wall is arranged in parallel to both the first exterior wall and the second exterior wall. Each cavity of the at least two cavities includes, at most, a single electrochemical cell. The electrochemical cell includes an electrode assembly, and the electrode assembly includes a single positive electrode, a single negative electrode, and a separator disposed between the positive electrode and the negative electrode. Each of the positive electrode, the negative electrode, and the separator have the form of a plate, and the positive electrode, the separator and the negative electrode are arranged in a stack such that the separator is sandwiched between the positive electrode and the negative electrode. The electrochemical cell comprises a cell housing that is formed of a flexible laminate material, and the electrode assembly is disposed inside the cell housing. The electrochemical cell is free of a cell housing, and the electrode assembly is disposed inside the one of the at least two cavities in such a way that one of the positive electrode and the negative electrode faces the at least one interior wall. A peripheral edge of the battery module housing defines a non-rectangular polygonal shape when the battery module is seen in top plan view. A peripheral edge of the battery module housing defines an irregular curvilinear shape when the battery module is seen in top plan view.

In some aspects, a battery module includes a battery module housing that is configured to receive a plurality of electrochemical cells. To that end., the battery module housing is segregated into individual cavities. Each cavity is shaped and dimensioned to receive a single electrochemical cell. Each electrochemical cell includes an electrode assembly that is sealed within a pouch-type, metal laminated film cell housing along with an electrolyte to form an energy storage unit. The electrode assembly is a "stacked" electrode assembly that includes a single, positive electrode plate and a single, negative electrode plate. The positive and negative electrode plates are stacked, and are separated by an intermediate separator plate. Since only a single positive and negative electrode plate are included in the electrode assembly, the electrode assembly is very thin, light in weight, and easy to manufacture. Since the electrode assembly is housed within a pouch-type cell housing, the cell size and shape have few limitations. For example, in some embodiments, the cell has a thickness in a range of 0.05 to 0.3 millimeters, and has length and width dimensions that are based on the required cell capacity, and may be, for example, in a range of 0.5 to 3.0 meters when used in a vehicle. Moreover, the relative thinness of the cell allows for a complex and/or curved geometry, which in turn allows the cell and battery pack to be tightly integrated into a vehicle body.

Because the cell has a single-layer electrode assembly with the terminals disposed at one end thereof, and because the cells are very thin, when the cells are stacked within the module, the cell terminals are very closely arranged. The close arrangement of cell terminals eliminates the need for lame and complex high current electrical connection networks that join individual cells. In addition, the cell terminal configuration also allows for a directly connected battery management system (BMS), which further reduces battery pack complexity, volume and cost.

In some aspects, the battery module is formed of a flexible metal foil laminate material and includes several cavities. In addition, the cells disposed in the cavities include the electrode assembly with the cell housing omitted. For example, the electrode assembly is disposed within the module cavity along with an electrolyte to form an energy storage unit within the cavity. The pouch-type battery module including cell housing-free cells is advantageous when compared to other embodiments in which the cell, including a cell housing and an electrode assembly disposed in the cell housing, is disposed in a cavity of the battery module. In particular, much less metal foil laminate material is required when housing free cells are disposed in the cavities, and cell cooling is also improved. This is because the walls of the module serve as both module housing walls and cell housing walls, and only one layer of metal foil laminate material separates the electrode assemblies of adjacent cells. In contrast, there are three layers of metal foil laminate material separating the electrode assemblies of adjacent cells when the cell includes a cell housing. The additional material layers not only result in additional cost, but also provide increased barriers to heat flow out of the cell and add to overall module thickness and mass.

DETAILED DESCRIPTION

Figure 1:
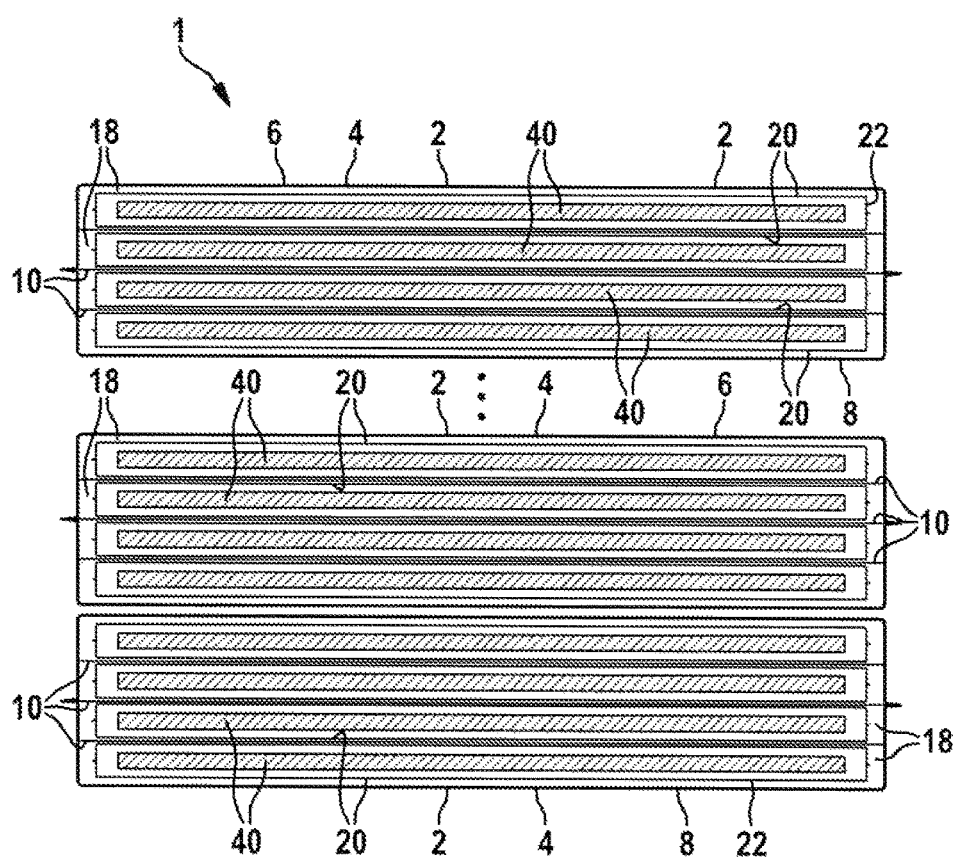
FIG. 1 is a cross-sectional view of a battery pack including several stacked modules.
Figure 2:
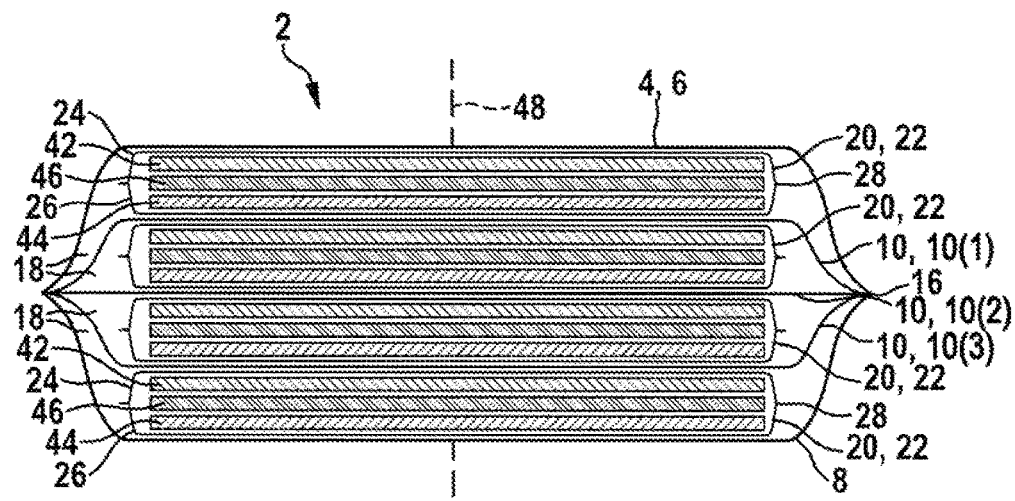
FIG. 2 is a cross-sectional view of a module of the battery pack of FIG. 1.

Referring to FIGS. 1-2, a battery pack 1 used to provide electrical power includes electrochemical cells 20. The cells 20 are very thin, large-area lithium-ion pouch cells that include a single-layer electrode assembly 40 that is sealed within a cell housing 22 along with an electrolyte to form an energy storage unit. Cells 20 are electrically interconnected and stored in an organized manner within a module housing 4 to form a battery module 2. The module housing 4 is segregated into a plurality of cavities 18. Each cavity 18 is configured to receive a single cell 20. Within the battery module 2, the cells 20 are electrically connected in series or in parallel, and within the battery pack 1, the battery modules 2 are electrically connected in series or in parallel. The resulting battery pack 1 is relatively thin, has a large area, and can be provided in any desired profile including complex, curved geometries, allowing for space efficient integration into a vehicle body, as discussed further below.

The battery pack 1 includes several modules 2 arranged in a stacked configuration. Each module 2 includes a module housing 4 formed of a flexible metal laminated foil. For example, the foil may be a three-layer aluminum laminated foil that includes a layer of aluminum foil sandwiched between a layer of polyamide and a layer of polypropylene. The interior space of the module housing 4 is segregated into separate individual cavities 18 via interior walls 10. The interior walls 01 may also formed of the flexible metal laminated foil, or of other appropriate materials.

In the illustrated embodiment, the module housing 4 is formed of a stacked arrangement of sheets of the metal laminated foil. The outermost sheet on one end of the stack of metal laminated foils corresponds to a first exterior wall 6 of the module housing 4, and the outermost sheet on the opposed end of the stack of metal laminated foils corresponds to a second exterior wall 8 of the module housing 4. Sheets disposed intermediate the first exterior wall 6 and the second exterior wall 8 correspond to the interior walls 10 of the module housing 4. The peripheral edges of the first exterior wall 6, the second exterior wall 8 and the interior walls 10 are joined together. For example, in some embodiments, a weld line forms a sealed joint 16 that extends along the peripheral edges of the walls 6, 8. 10. Since the exterior walls 6, 8 and the interior walls 10 are joined along a common sealed joint 16, the interior walls 10 are arranged in parallel to both the first exterior wall 6 and the second exterior wall 8.

A cavity 18 is defined between each pair of adjacent walls 6, 8, 10, and the number of cavities 18 provided in a module housing 4 corresponds to the number of interior walls 10 plus one. Each cavity 18 is shaped and dimensioned to receive a single cell 20, with minimal excess space. Thus, each cavity 18 of the module 2 includes, at most, a single cell 20.

Figure 3:
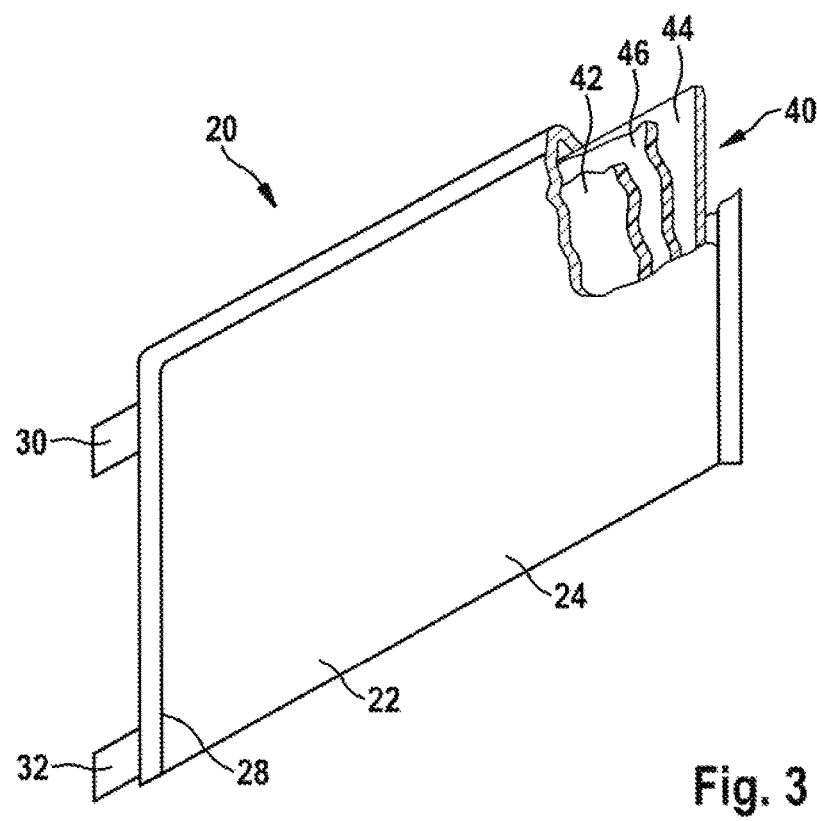
FIG. 3 is a partially cut-away perspective view of a cell.
Figure 4:
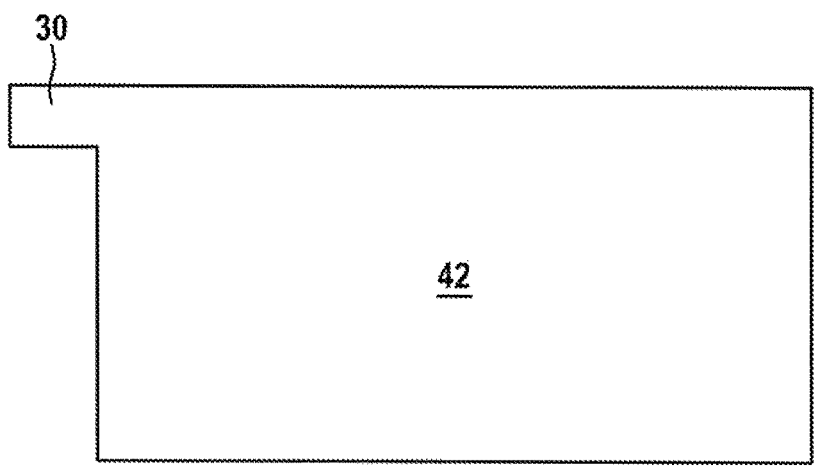
FIG. 4 is a top plan view of the positive electrode plate.
Figure 5:
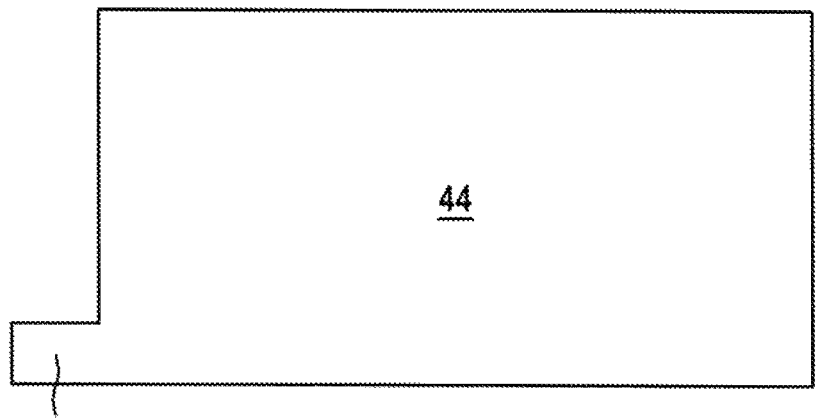
FIG. 5 is a top plan view of the negative electrode plate.

Referring to FIGS. 3-5, each cell 20 includes a pouch-type cell housing 22 and the electrode assembly 40 that is disposed inside the cell housing 22. The electrode assembly 40 includes a single positive electrode plate 42, a single negative electrode plate 44 and a separator plate 46. The term plate is used herein to refer to a geometry that is generally flat, and in which length and width dimensions are much greater (e.g., at least a hundred times greater) than the thickness dimension.

The positive and negative electrode plates 42, 44 each have a layered structure to facilitate insertion and/or movement of lithium-ions. For example, the positive electrode plate 42 may include a first substrate formed of a first electrically-conductive material such as copper, and a first active material such as a graphite coating that is disposed on one or both sides of the first substrate. In addition, the negative electrode plate 44 includes a second substrate formed of a second electrically-conductive material such as aluminium, and a second active material such as a lithiated metal oxide coating that is disposed on one or both sides of the second substrate.

The separator plate 46 is a permeable membrane that functions to keep the positive and negative electrode plates 42, 44 apart to prevent electrical short circuits while also allowing passage of ionic charge carriers provided in the electrolyte and that are needed to close the circuit during the passage of current within the cell 20. The separator plate is formed of an electrically insulating material such as a trilayer polypropylene-polyethylene-polypropylene membrane.

The positive electrode plate 42 and the negative electrode plate 44 are arranged in a stacked or layered configuration in which the separator 46 is disposed (e.g., sandwiched) between the positive electrode plate 42 and the negative electrode plate 44. A stack axis 48 of the electrode assembly 40 extends through a center of the electrode assembly 40 in a direction parallel to the stacking direction. In the stacked configuration, the positive electrode plate 42, the negative electrode plate 44 and the separator 46 are stacked along the stack axis 48 such that peripheral edges of each of the plates 42, 44, 46 are aligned in a direction parallel to the direction of the stack axis 48.

The positive and negative electrode plates are very thin (e.g., having a thickness on the order of about 0.04 to 0.15 mm) compared to the overall cell thickness (e.g. having a thickness on the order of about 0.3 to 1.0 mm) and thus are illustrated schematically and not to scale in the figures.

The cell housing 22 is an assembly of two sheets of a flexible metal laminated foil material, or of a folded single sheet of the metal laminated film. In the illustrated embodiment, the cell housing 22 has a rectangular shape, and includes a first exterior wall 24 and a second exterior wall 26 that is joined to the first exterior wall 24 along a sealed joint 28 that extend along a peripheral edge of the cell housing 22. The electrode assembly 40 is disposed in the cell housing 22 such that the positive and negative electrode plates 42, 44 each face one of the two exterior walls 24, 26, and the electrode assembly 40 is sealed with the cell housing 22 along with an electrolyte.

A positive terminal 30 protrudes from a peripheral edge of the positive electrode plate 42 and extends through the sealed joint 28 along one side of the cell housing 22. Likewise, a negative terminal 32 protrudes from a peripheral edge of the negative electrode plate 44 and extends through the sealed joint 28 along the same side of the cell housing 22, so as to reside adjacent to but spaced apart from the positive terminal 30. The positive and negative terminals 30, 32 are free of active material, whereby the electrically-conductive substrate is exposed. In the illustrated embodiment, the positive and negative terminals 30, 32 are flattened tabs that are formed integrally with the electrode plate for example in a stamping operation, but are not limited to this configuration. In other embodiments, the positive and negative terminals 30, 32 are formed separately from the corresponding electrode plates 42, 44 and then electrically connected thereto for example in a welding operation.

The cell 20 including the cell housing 22 and the electrode assembly 40 is thin relative to some conventional pouch cells since the cell 20 includes only a single positive and negative electrode plate 42, 44. However, cell capacity may be increased by providing the cell in a large format, in other words by providing the cell with relatively large length and width dimensions to ensure that capacity requirements are met. For example, each cell 20 may have length and width dimensions of 1000 mm or more, and a thickness of about 0.3 mm, as compared to some convention pouch cells that may have length and width dimensions of about 200 mm and a thickness of about 10 mm.

The number of cavities 18 in the module 2 is at least two, and is determined by the cell size and the requirements of the specific application. In the embodiment illustrated in FIG. 2, the module housing 4 includes three interior walls 10(1), 10(2), 10(3), and thus includes four cavities 18. A single cell 20 is disposed in each cavity 18 such that the stack axis 48 is perpendicular to the interior walls 10(1), 10(2), 10(3). The elements of the module 2 as shown in FIG. 2, including the electrode plates 42, 44 of the electrode assembly 40, the cell housings 22 and the module housing 4 are illustrated schematically and not to scale so as to permit visualization of these elements.

Figure 6:
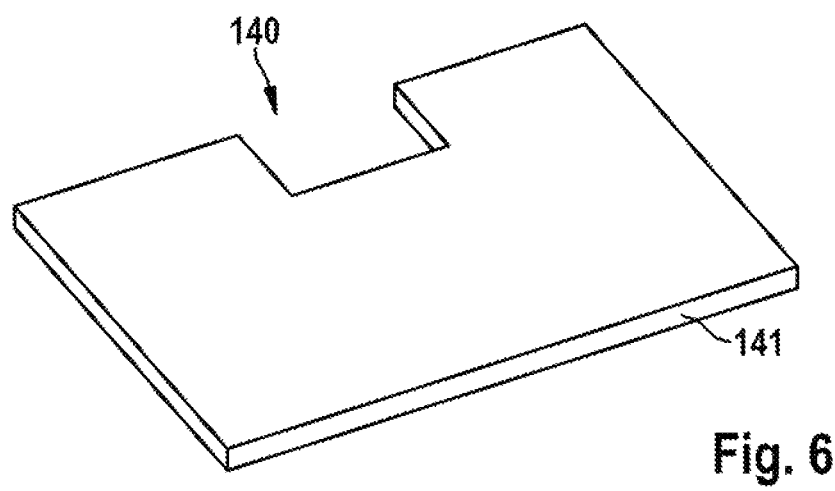
FIG. 6 is a perspective view of an alternative embodiment module.
Figure 7:
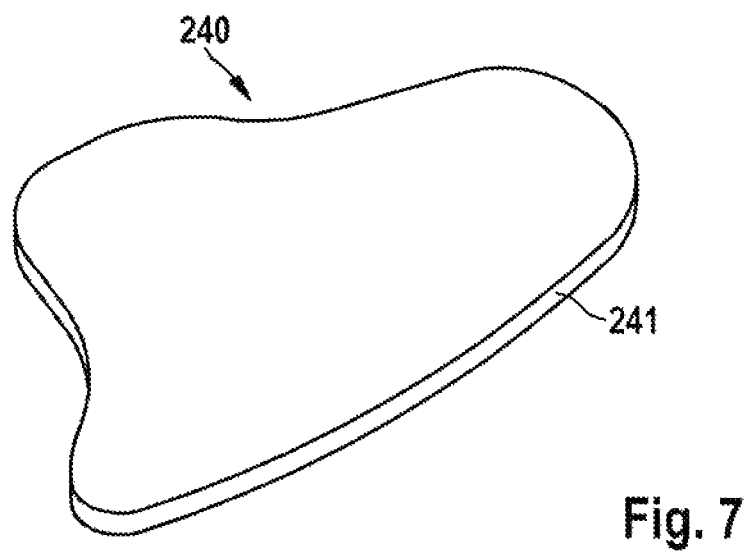
FIG. 7 is a perspective view of another alternative embodiment module.

In the embodiment illustrated in FIGS. 1-5, the cell 20 has a rectangular peripheral shape, and the module housing 4 and cavities 18 within the module housing 4 also have a rectangular shape to correspond to the peripheral shape of the cells 20. However, the cells 20 and module 2 are not limited to having a rectangular peripheral shape, and the cells 20 and module 2 may be formed having a curved or irregular peripheral shape. For example, as seen in FIG. 6, a peripheral edge 141 of an alternative module housing 140 defines a non-rectangular polygonal shape when the module housing 140 is seen in top plan view. For another example, as seen in FIG. 7, a peripheral edge 241 of another alternative module housing 240 defines an irregular curvilinear shape when the module housing 240 is seen in top plan view. Since the cells 20 and module 2 may have a curved or irregular peripheral shape, the corresponding battery pack 1 can be tightly integrated into a vehicle body.

Figure 8:
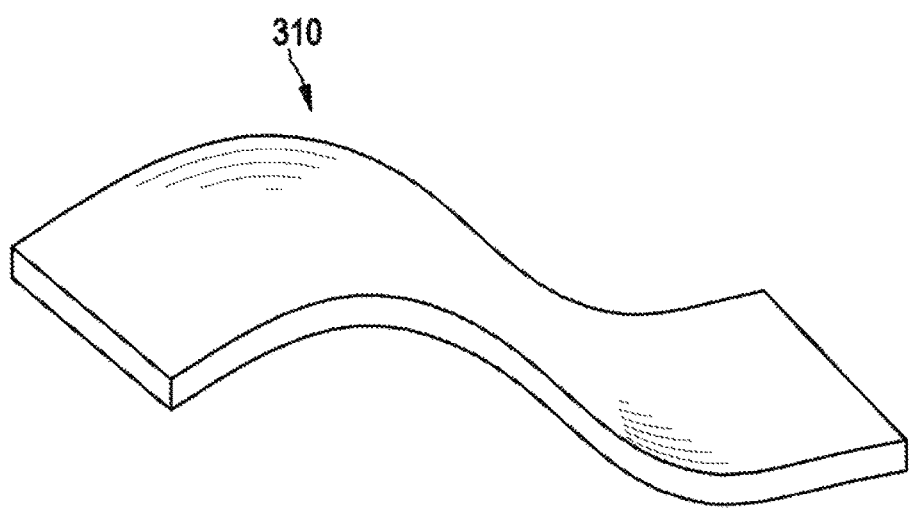
FIG. 8 is a perspective view of another alternative embodiment module.

In the embodiments illustrated in FIGS. 1-7, the battery module 2 and the cells 20 have a generally planar configuration. However, the battery module 2 and the cells 20 are not limited to having a generally planar configuration, and the cells 20 and module 2 may be formed having a nonplanar configuration. For example, as seen in FIG. 8, another embodiment battery module 310 has a complex curved and non-planar geometry. This feature further facilitates the ability of the module 310, and thus the battery pack 1 including the module 310, to be tightly integrated into a vehicle body.

Figure 9:
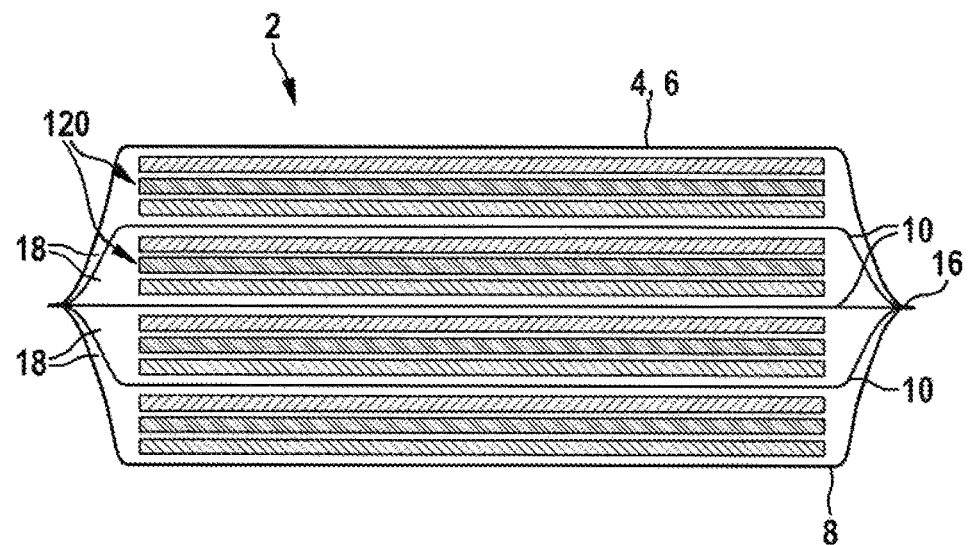
FIG. 9 is a cross-sectional view of the module of FIG. 3 including an alternative embodiment cell.

Referring to FIG. 9, an alternative embodiment cell 120 is disposed in the cavities 18 of the module 2. The cells 120 are simplified relative to the cells 20 described above. In particular, the each of the cells 120 disposed in the battery module 2 are free of a cell housing, and the electrode assembly 40 is sealed inside a corresponding cavity 18 along with an electrolyte to form an energy storage unit within the cavity 18. In addition, the cell 120 is disposed the cavity 18 in such a way that at least one of the positive electrode plate 42 and the negative electrode plate 44 faces an interior wall 10 of the module 2.

In the illustrated embodiments, the module housing 4 is formed of a stacked arrangement of sheets of the metal laminated foil, and the peripheral edges of the stacked sheets are joined together along the common seal joint 16. It is understood, however, that the module housing 4, including the cavities 18, can be fabricated using other methods. For example, sheets of the metal foil laminate material may be folded into a multi-cavity configuration, and then sealed using heat and/or other techniques.

In the embodiment illustrated in FIG. 1, the battery pack 1 includes several modules 2 that are electrically connected in series, parallel or a combination thereof. A battery pack may include as few as one module 2, but including multiple modules 2 in a battery pack 1 is advantageous since individual modules 2 can be serviced or replaced if needed without having to replace all of the modules 2 within the battery pack 1.

In the illustrated embodiments, the module 2 includes four cavities 18. The module 2 is not limited to having four cavities 18, and can include a greater or fewer number of cavities 18. The number of cavities 18 will depend on the overall requirements of the application and the sized of the cells 20 used in the application. For example, to accommodate safety requirements in which a maximum output of the module is 60 V, the number of cavities may be in a range of 8 to 12, depending on the size of the cell 20 to be disposed in the cavities 18.

Figure 10:
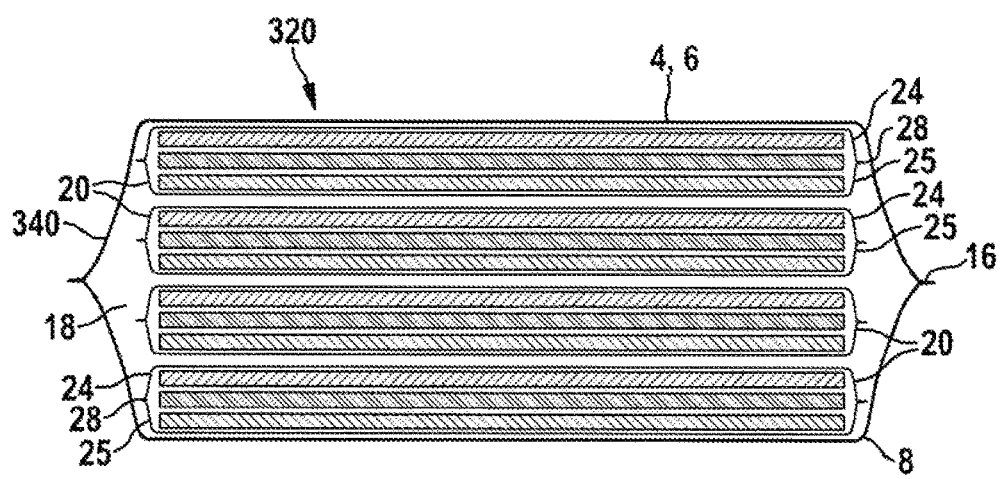
FIG. 10 is a cross-sectional view of another alternative embodiment module.

Referring to FIG. 10, another alternative module 320 has a module housing 340 that includes a single cavity 18, with several cells 20 disposed within the single cavity. In this embodiment, the pouch cell housing walls 24, 25 replace the interior walls 10 of the module housing 340.

Although the cells 20 are described herein as being lithium-ion cells, the cells 20 are not limited to having a lithium-ion chemistry. For example, the cells 20 may have other chemistries, including aluminum-ion, alkaline, nickel-cadmium, nickel metal hydride, or other appropriate chemistry.

Although the module housing 4 and the cell housing 22 are formed of a three-layer aluminum laminated foil, the material used to form the module housing 4 and the cell housing is not limited to the three-layer aluminum laminated foil. For example, in some embodiments, a greater or fewer number of layers may be used to form the aluminum laminated foil. In other embodiments, the metal layer is formed of a different metal such as, but not limited to, steel. In still other embodiments, an appropriate non-laminate material is used.

Selective illustrative embodiments of the battery system including the cell are described above in some detail. It should be understood that only structures considered necessary for clarifying these devices have been described herein. Other conventional structures, and those of ancillary and auxiliary components of the battery system, are assumed to be known and understood by those skilled in the art. Moreover, while working examples of the battery system and battery cell have been described above, the battery system and/or battery cell are not limited to the working examples described above, but various design alterations may be carried out without departing from the devices as set forth in the claims.

What is claimed is:

1. A battery module, the battery module including a battery module housing and an electrochemical cell disposed in the battery module housing,
    the battery module housing including
        a first exterior wall comprising a first sheet of a first flexible laminate material,
        a second exterior wall comprising a second sheet of the first flexible laminate material, the second exterior wall, together with the first exterior wall, defining an interior space therebetween, and
        at least one interior wall that segregates the interior space into at least two cavities, the at least one interior wall comprising a third sheet of the first flexible laminate material, the third sheet being disposed between the first sheet and the second sheet in a stacked arrangement of the first sheet, the second sheet and the third sheet, wherein
    the electrochemical cell is disposed in one of the at least two cavities, the electrochemical cell comprising a cell housing that is formed of a second flexible laminate material, and an electrode assembly that is disposed inside the cell housing, and
    a peripheral edge of the first exterior wall, a peripheral edge of the second exterior wall, and a peripheral edge of the at least one interior wall are joined together at a single, common seal joint.

2. The battery module of claim 1, wherein the at least one interior wall is arranged in parallel to both the first exterior wall and the second exterior wall.

3. The battery module of claim 1, wherein the electrochemical cell is one of a plurality of electrochemical cells, and each cavity of the at least two cavities includes, at most, a single one of the electrochemical cells.

4. The battery module of claim 1, wherein a peripheral edge of the battery module housing defines a non-rectangular polygonal shape when the battery module is viewed in a direction perpendicular to the at least one interior wall.

5. The battery module of claim 1, wherein a peripheral edge of the battery module housing defines an irregular curvilinear shape when the battery module is viewed in a direction perpendicular to the at least one interior wall.

6. The battery module of claim 1, wherein the electrode assembly includes a single positive electrode, a single negative electrode, and a separator disposed between the positive electrode and the negative electrode.

7. The battery module of claim 6, wherein each of the positive electrode, the negative electrode, and the separator have the form of a plate, and the positive electrode, the separator and the negative electrode are arranged in a stack such that the separator is sandwiched between the positive electrode and the negative electrode.

8. A battery module for receiving electrochemical cells, the battery module including a battery module housing, and the electrochemical cells disposed in the battery module housing,
    the battery module housing including
        a first exterior wall comprising a first sheet of a first flexible laminate material,
        a second exterior wall comprising a second sheet of the first flexible laminate material, the second exterior wall, together with the first exterior wall, defining an interior space therebetween, and
        at least one interior wall that segregates the interior space into at least two cavities, the at least one interior wall comprising a third sheet of the first flexible laminate material, the third sheet being disposed between the first sheet and the second sheet in a stacked arrangement of the first sheet, the second sheet and the third sheet,
    wherein
        each cavity of the at least two cavities is shaped and dimensioned to accommodate, at most, a single one of the electrochemical cells,
        each cavity of the at least two cavities includes, at most, a single one of the electrochemical cells, each electrochemical cell comprising a cell housing that is formed of a second flexible laminate material, and an electrode assembly that is disposed inside the cell housing, and
        a peripheral edge of the first exterior wall, a peripheral edge of the second exterior wall, and a peripheral edge of the at least one interior wall are joined together at a single, common seal joint.

9. The battery module of claim 8, wherein the at least one interior wall is arranged in parallel to both the first exterior wall and the second exterior wall.

10. The battery module of claim 8, wherein a peripheral edge of the battery module housing defines a non-rectangular polygonal shape when the battery module is viewed in a direction perpendicular to the at least one interior wall.

11. The battery module of claim 8, wherein a peripheral edge of the battery module housing defines an irregular curvilinear shape when the battery module is viewed in a direction perpendicular to the at least one interior wall.

12. The battery module of claim 8, wherein the electrode assembly includes a single positive electrode, a single negative electrode, and a separator disposed between the positive electrode and the negative electrode.

13. The battery module of claim 12, wherein each of the positive electrode, the negative electrode, and the separator have the form of a plate, and the positive electrode, the separator and the negative electrode are arranged in a stack such that the separator is sandwiched between the positive electrode and the negative electrode.

* * * * *